United States Patent
Zhang et al.

(10) Patent No.: US 10,171,179 B2
(45) Date of Patent: Jan. 1, 2019

(54) OPTICAL MODULE AND OPTICAL LINE TERMINAL DEVICE

(71) Applicants: Hisense Broadband Multimedia Technologies Co., Ltd., Qingdao (CN); Hisense Broadband Multimedia Technologies, Ltd., Tortola (VG)

(72) Inventors: Qiang Zhang, Qingdao (CN); Qisheng Zhao, Qingdao (CN)

(73) Assignees: HISENSE BROADBAND MULTIMEDIA TECHNOLOGIES CO., LTD., Qingdao (CN); HISENSE BROADBAND MULTIMEDIA TECHNOLOGIES, LTD., Tortola (VG)

( * ) Notice: Subject to any disclaimer, the term of this patent is extended or adjusted under 35 U.S.C. 154(b) by 0 days.

(21) Appl. No.: 15/392,656

(22) Filed: Dec. 28, 2016

(65) Prior Publication Data

US 2017/0338896 A1 Nov. 23, 2017

(30) Foreign Application Priority Data

May 18, 2016 (CN) .......................... 2016 1 0328255

(51) Int. Cl.
*H04B 10/80* (2013.01)
*G02B 6/42* (2006.01)
(Continued)

(52) U.S. Cl.
CPC .......... *H04B 10/801* (2013.01); *G02B 6/428* (2013.01); *H04B 10/25* (2013.01); *H04B 10/27* (2013.01); *H04B 10/40* (2013.01); *H04B 10/503* (2013.01)

(58) Field of Classification Search
CPC .... H04B 10/801; H04B 10/503; H04B 10/40; H04B 10/27; G02B 6/428
See application file for complete search history.

(56) References Cited

U.S. PATENT DOCUMENTS

| 2004/0151073 A1* | 8/2004 | Preisach | H04B 10/25 368/110 |
| 2010/0172650 A1* | 7/2010 | Deng | H04B 10/504 398/135 |

(Continued)

FOREIGN PATENT DOCUMENTS

| CN | 202713309 U | 1/2013 |
| CN | 103650388 A | 3/2014 |

(Continued)

OTHER PUBLICATIONS

EPO Extended European Search Report for EP Application No. 17152414.3, dated Aug. 9, 2017, (8p).

(Continued)

*Primary Examiner* — Leslie C Pascal
(74) *Attorney, Agent, or Firm* — Brinks Gilson & Lione

(57) ABSTRACT

An optical module and an optical line terminal device are disclosed. According to an example, the optical line terminal device comprises a system board and an optical module. The system board comprises an optical module control circuit comprising a main control chip and a drive circuit. The optical module comprises a circuit board provided with an electrical interface, an optical assembly and a memory unit. The memory unit is configured to store an operation parameter of the optical assembly. The electrical interface has a first pin to be connected with a drive end of the optical assembly and a second pin to be connected with a data transmission pin of the memory unit. In this way, main control chip is allowed to read the operation parameter of the optical assembly through the first pin and configure the drive circuit accordingly, while the drive circuit is allowed to drive the optical assembly through the second pin.

10 Claims, 3 Drawing Sheets

(51) Int. Cl.
*H04B 10/50* (2013.01)
*H04B 10/27* (2013.01)
*H04B 10/40* (2013.01)
*H04B 10/25* (2013.01)

(56) References Cited

U.S. PATENT DOCUMENTS

2016/0285224 A1* 9/2016 Zhang ................. H01S 5/06804
2017/0179627 A1* 6/2017 Nelson ................... H04B 10/40

FOREIGN PATENT DOCUMENTS

| CN | 102625199 B | 6/2014 |
| CN | 102739318 B | 1/2016 |
| EP | 1764988 A1 | 3/2007 |
| WO | WO 2015198667 A1 | 12/2015 |

OTHER PUBLICATIONS

State Intellectual Property Office of the People's Republic of China First Office Action and Search Report issued to Chinese Application No. 201610328255.X, dated Dec. 14, 2017, (6p).

* cited by examiner

OPTICAL MODULE AND OPTICAL LINE TERMINAL DEVICE

CROSS-REFERENCE TO RELATED APPLICATIONS

The application claims priority to Chinese Patent Application No. 201610328255.X, filed on May 18, 2016, the entire contents of which are hereby incorporated by reference for all purposes.

TECHNICAL FIELD

The present invention relates to an optical module in an optical fibre communication system.

BACKGROUND

In an optical fibre communication system, Optical Line Terminator (OLT) may be arranged in the centre office of an access network. The OLT may be configured to transform an electrical signal output from a switcher into an optical signal and then transmit the optical signal, and/or transform an optical signal received from outside into an electrical signal and then transmit the electrical signal to the switcher.

For example, an optical module of an OLT in a 10G Passive Optical Network (PON) may comprise any one or more of the following: an electro-absorption modulated laser (EML), a laser diode driver (LDD), a clock data recovery (CDR), a thermoelectric cooling control (TEC) drive, an electro-absorption biasing circuit (EM Bias-T); an advanced photon detector (APD), a limited amplifier (LIA), an APD boost voltage and Received Signal Strength Indicator (RSSI) sample-and-hold circuit, and a microcontroller unit (MCU).

The optical module may be encapsulated as a 30 pin gold finger (10 gigabit small form factor pluggable, XFP) or a 20 pin gold finger (10 gigabit small form factor pluggable plus, SFP+) and have a configuration of a relative larger volume.

SUMMARY

According to one aspect of the present disclosure, an optical module is provided. The optical module may comprises a housing, a circuit board arranged in the housing and provided with an electrical interface, an optical assembly arranged in the housing, and an memory unit arranged in the housing. Wherein, the optical assembly is configured to be connected with the circuit board electrically and to perform signal transformation between an optical signal and an electrical signal. The memory unit is configured to be connected with the circuit board electrically and to store an operation parameter of the optical assembly. The electrical interface is configured with a first pin to be connected with a data transmission pin of the memory unit and a second pin to be connected with a drive end of the optical assembly. A main control chip in a outside system is allowed to read the operation parameter of the optical assembly through the first pin, while a drive circuit in the outside system is allowed to drive the optical assembly through the second pin in case that the drive circuit is configured in accordance with the operation parameter of the optical assembly by the main control chip.

According to another aspect of the present disclosure, an optical line terminal device is provided. The optical module comprises a housing, a circuit board arranged in the housing and provided with an electrical interface, an optical assembly arranged in the housing and a memory unit arranged in the housing. The optical assembly is configured to be connected with the circuit board electrically and to perform signal transformation between an optical signal and an electrical signal. The memory unit is configured to be connected with the circuit board electrically and to store an operation parameter of the optical assembly. The system board is provided with an optical module control circuit which is configured to be pluggable connected with the optical module by a slot matching with the electrical interface of the optical module and comprises a main control chip and a drive circuit. The electrical interface is configured with a first pin to be connected with a data transmission pin of the memory unit and a second pin to be connected with a drive end of the optical assembly. In this way, the main control chip is allowed to read the operation parameter of the optical assembly through the first pin, while the drive circuit is allowed to drive the optical assembly through the second pin in case that the drive circuit is configured in accordance with the operation parameter of the optical assembly by the main control chip.

By encapsulating an optical assembly and a memory unit configured to store an operation parameter of the optical assembly in an optical module and arranging an control circuit of the optical module in a system board external to the optical module, the volume of the optical module may be decreased. Further, the number of pins configured to connect the optical module with the system board may also be decreased, and thereby the number of pluggable optical modules on one single system board of an optical line terminal device may be increased effectively.

BRIEF DESCRIPTION OF DRAWINGS

The details of one or more embodiments of the subject matter described in the present disclosure are set forth in the accompanying drawings and description below. Features of the present disclosure are illustrated by way of example and not limited in the following figures, in which like numerals indicate like elements.

DETAILED DESCRIPTION

Figure 1:
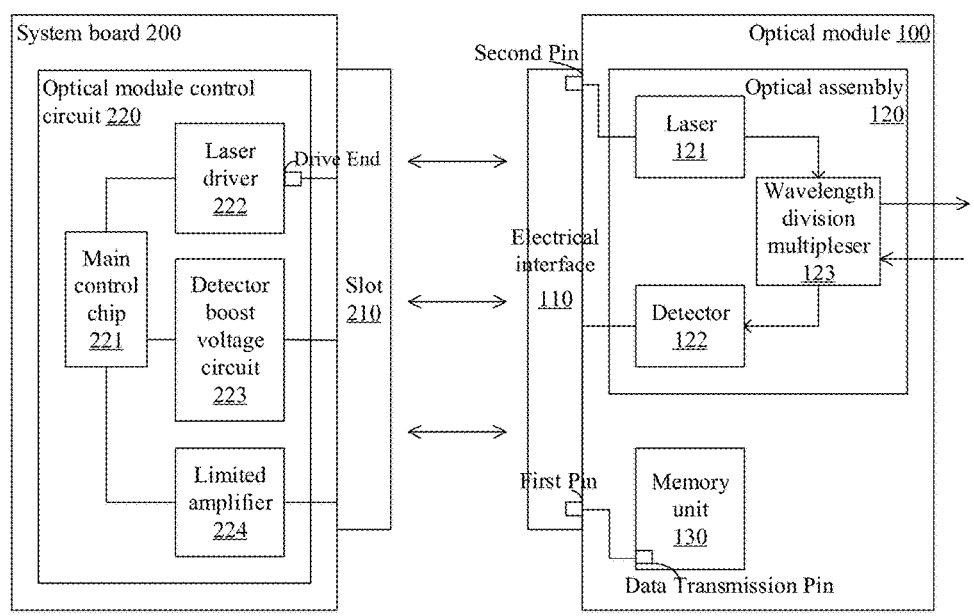
FIG. 1 is a block diagram illustrating the principle of an optical module according to an example of the present invention.

As shown in FIG. 1, an optical module proposed according to an embodiment of the present invention may comprises a housing (not shown) as well as a circuit board (not shown completely), an optical assembly 120 and a memory unit 130 arranged in the housing. Where, the optical assembly 120 and the memory unit 130 may connect with the circuit board respectively. The optical assembly 120 may be configured to generate a downstream optical signal of a rate and wavelength in accordance with an electrical signal and/or transform a received upstream optical signal of a rate and wavelength corresponding to a burst mode into an electrical signal. The memory unit 130 may be configured to store an operation parameter of the optical assembly 120.

The optical assembly 120 and the memory unit 130 may be encapsulated in the housing (not shown). The circuit board may be configured with an electrical interface 110. The electrical interface 110 may be configured with pins respectively to be connected with an emitting end, a receiving end and a power supply end of the optical module 100, a drive end of the optical assembly 120 as well as a data transmission pin of the memory unit 130.

When the optical module 100 is in operation, a main control chip 221 configured on the system board 200 outside the housing may be configured to read the operation parameter of the optical assembly 120 through the electrical interface 110. The main control chip 221 may configure a drive circuit such as a laser drive 222, a detector boost voltage circuit 223 and so on in accordance with the read operation parameter of the optical assembly 120, and the configured drive circuit may load a corresponding drive signal onto the optical assembly 120 through the electrical interface 110.

By keeping basic components such as the optical assembly 120 and the memory unit 130 in the housing of the optical module, the volume of the optical module 100 according to the present embodiment may be decreased effectively. An optical module control circuit 220 configured to control the optical module 100 may be arranged in the system board 200 outside of the optical module 100, and the optical assembly 120 may be configured to connect with the optical module control circuit 220 through the electrical interface 110. Compared with the control circuit of the optical module encapsulated in the housing of the optical module, the number of pins for the electrical interface 110 may be decreased correspondingly, and the volume of the optical module 100 may also be decreased correspondingly.

Further, since the volume of an individual optical module is decreased, the number of pluggable optical modules on one single system board of an optical line terminal device may be increased correspondingly, thus promoting the density of optical modules on the system board and expanding the capacity of the system board effectively. Moreover, since the memory unit 130 is configured to store the operation parameter of the optical assembly 120, the optical module 100 may be produced, sold and used as an individual product.

The optical assembly 120 may be a laser or a detector individually, even or simultaneously include both. When a laser 121 and a detector 122 are simultaneously included in the optical assembly 120, the optical assembly 120 may further comprise a wavelength division multiplexer 123. The wavelength division multiplexer 123 may be configured to receive a downstream optical signal output from the laser 121, perform a wavelength division multiplexing on the received downstream optical signal and output the multiplexed downstream optical signal. The wavelength division multiplexer 123 may be further configured to receive an upstream optical signal, perform a demultiplexing on the received upstream optical signal and output the de-multiplexed upstream optical signal to the detector 122.

In the present embodiment, the memory unit 130 may be an electrically erasable programmable read-only memory (EERPOM), and the electrical interface 110 may be a gold finger.

The laser 121 of the present embodiment may be an electro-absorption modulated laser (EML). When employing the EML, the electrical interface 110 may be configured with 14 pins in accordance with the function implementation requirement of the laser 121.

According to another example, the laser 121 may be a directly modulated laser (DML) for a gigabit-capable passive optical network (GPON)/an Ethernet passive optical network (EPON) or a distributed feedback laser (DFB). When employing the DFB, the electrical interface 110 may be configured with 10 pins in accordance with the function implementation requirement of the laser 121.

It can be seen from above that the number of pins required for the electrical interface 110 may be ten to no more than twenty regardless the laser is an EML, a DFB or of any other types. Compared to the configuration encapsulated with XFP (30 pin gold finger) or SFP+(20 pin gold finger) for an optical module, the number of pins may be decreased to half or even more. As the number of components encapsulated in the housing of the optical module is decreased, the volume of the optical module is decreased accordingly, and the number of pins for the electrical interface is decreased additionally, the area occupied by an individual optical module on the system board may be decreased effectively and thereby the number of optical modules carried by one single system board may be increased effectively.

Based on the above optical module, an optical line terminal device is provided according to an example of the present invention. As shown in FIG. 1, the optical line terminal device may comprise a system board 200 and an optical module 100. Where, the system board 200 may be configured with a plurality of slots 210 and a plurality of optical module control circuit 220 respectively connected to one of the slots 210. The optical module 100 may be in pluggable connection with a corresponding optical module control circuit 220 by a slot 210 matching with the electrical interface 110 provided on it. The optical module control circuit 220 may comprise at least a main control chip 221 and a drive circuit such as a laser drive 222, a detector boost voltage circuit 223 etc.

As mentioned above, the optical module 100 may comprise the optical assembly 120 and the memory unit 130. Where, the optical assembly 120 may be configured to generate a downstream optical signal of a rate and wavelength in accordance with an electrical signal and/or to transform a received upstream optical signal of a rate and wavelength corresponding to a burst mode into an electrical signal. The memory unit 130 may be configured to store an operation parameter of the optical assembly 120. The optical assembly 120 and the memory unit 130 may be arranged in the housing (not shown) provided with the electrical interface 110. The pins of the electrical interface 110 may be configured to connect an emitting end, a receiving end and a power supply end of the optical module 100, a drive end of the optical assembly 120 as well as a data transmission pin of the memory unit 130. When the optical module 100 operating, the main control chip 221 may read the operation parameter of the optical assembly 120 stored in the memory unit 130 through the electrical interface 110 and may configure a drive circuit provided on the system board 200 in accordance with the read operation parameter of the optical assembly 120, such that the drive circuit may load a drive signal onto the optical assembly 120 through the electrical interface 110.

For example, after the optical module 100 is powered up by plugging the electrical interface 110 into a corresponding slot 210, the main control chip 221 may read the operation parameter of the optical module 100 stored in the memory unit 130 and then control the laser drive 222, a limited amplifier 224 and the detector boost voltage circuit 223 and so on in accordance with the operation parameter read from the memory unit 130 of the optical module 100.

The present optical line terminal device simultaneously comprises the above optical module 100 and the system board 200 configured to carry the optical module 100. As can be seen from the above, the laser 121 in the optical module 100 may be of various types, and thus there are different electrical interfaces 110. Accordingly, different slots 210 respectively corresponding to each of the different electrical interfaces 110 may be configured on the system board 200. The volume of the optical module 100 and the number of pins for the electrical interface 110 may be decreased effectively by arranging the optical module control circuit 220 in the system board 200 outside of the optical module 100, such that the number of pluggable optical modules on a single system board of the optical line terminal device may be effectively increased.

The optical assembly 120 in the optical module 100 may be a laser or a detector individually, even or simultaneously include the both. When the optical assemble 120 comprises the laser 121 and the detector 122 simultaneously, the optical assemble 120 may further comprise a wavelength division multiplexer 123. The wavelength division multiplexer 123 may be configured to receive a downstream optical signal output from the laser 121, perform a wavelength division multiplexing on the received downstream optical signal and output the multiplexed downstream optical signal; or receive an upstream optical signal, perform a demultiplexing on the received upstream optical signal and output the demultiplexed upstream optical signal to the detector 122.

When the optical assembly 120 comprises the laser 121, taking the laser 121 being an electro-absorption modulated laser (EML) as an example, it will describe in detail how the number of pins for the optical module 100 as follows.

Figure 2:
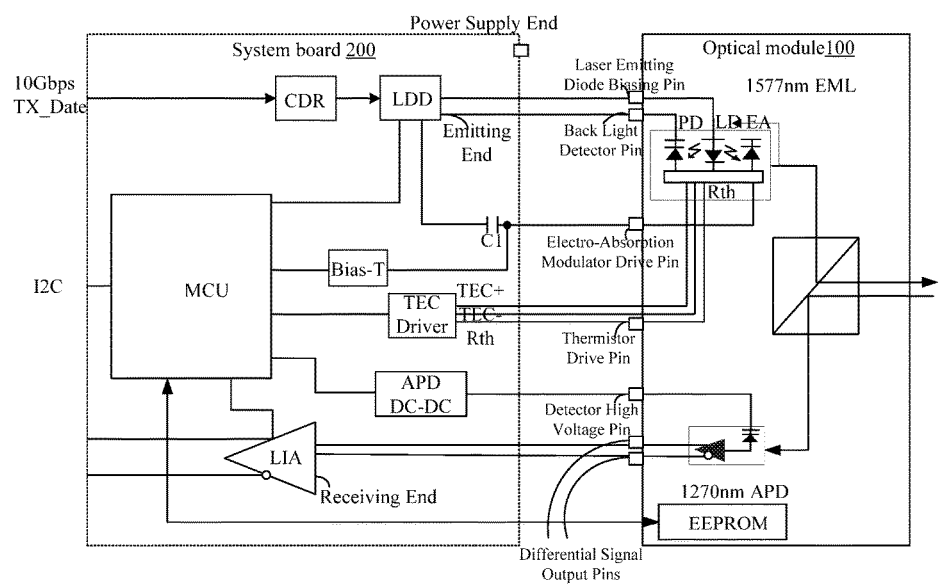
FIG. 2 is an electrical schematic diagram of an optical module according to an example of the present invention.

As shown in FIG. 2, in a 10G PON OLT optical module, an electro-absorption modulated laser (EML) with a center wavelength of 1577 nm may be employed according to provisions of the protocol. The laser may transform a downstream electrical signal into an optical signal and send the optical signal out. The EML may comprise an electro-absorption modulator EA, a laser diode LD, a photon detector PD and a thermistor Rth.

The electro-absorption modulator EA, laser diode LD and photon detector PD in the EML may stabilize power and wavelength of the downstream emitting light by cooperating with corresponding drive circuits. The drive circuit of the optical module control circuit 220 on the system board 200 may include a laser driver LDD. The optical module control circuit corresponding to the laser may further include a clock recovery unit CDR, an electro-absorption biasing circuit Bias-T, a thermoelectric cooler controller TEC Driver.

Where, the clock recovery unit CDR on the optical module control circuit 220 may receive a downstream electrical signal sent by the system board 200, perform a clock recovery reshaping on the received downstream electrical signal and send the reshaped downstream electrical signal to the laser driver LDD. The laser driver LDD may connect with the electro-absorption modulator EA through an electro-absorption modulator drive pin in the electrical interface, connect with the laser emitting diode LD through a laser emitting diode biasing pin in the electrical interface, and connect with the back light detector PD through a back light detector pin in the electrical interface respectively. The thermoelectric cooler controller TEC Driver may connect with the thermistor Rth through a thermistor drive pin in the electrical interface. Due to characteristics of the EML, a negative voltage may be required to enable the electro-absorption modulator EA operate, and the electro-absorption biasing circuit Bias-T may provide a static negative voltage to the electro-absorption modulator EA through the electro-absorption modulator drive pin in the electrical interface. The laser driver LDD may transform a signal received from the clock recovery unit CDR into a modulated electrical signal swing, load the modulated electrical signal swing on the electro-absorption modulator EA through the electro-absorption modulator drive pin in the electrical interface, and further modulate the electrical signal onto an optical carrier. The laser driver LDD may provide the laser emitting diode LD in the laser with a biasing current through the laser emitting diode biasing pin in the electrical interface, and form an automatic power control (APC) circuit with the back light detector PD in the laser through the back light detector pin in the electrical interface, so as to maintain the stability of emitting optical power of the laser emitting diode LD. The thermoelectric cooler controller TEC Driver may connect with the thermistor Rth and TEC pins through a TEC drive current pin and the thermistor pin in the electrical interface. The thermistor Rth may be adjacent to the laser emitting diode LD so as to detect the temperature of LD accurately. The resistance of the thermistor Rth may reflect the temperature characteristics of the laser in real time. The thermoelectric cooler controller TEC may sample a simulator of the thermistor Rth in the laser and inject a forward or reverse current by the TEC+ and TEC− to maintain the stability of the simulator for the thermistor Rth, so that an Automatic Temperature Control (ATC) control may be achieved in turn to maintain the stability of the laser wavelength.

When the optical assembly in the optical module 100 comprises the detector APD at the same time, the drive circuit of the optical module control circuit 220 on the system board 200 may further include a detector boost voltage circuit APD DC-DC and a limited amplifier circuit LIA for driving the detector. The detector boost voltage circuit APD DC-DC may be configured to provide a voltage much higher than a supply voltage of the optical module which may be required by the normal operation of the detector APD. Meanwhile, a burst received optical power of the detector APD may be monitored by means of a mirrored current source and a sample hold circuit. The detector boost voltage circuit APD DC-DC may connect a main control chip MCU with its input end, and its output end may connect with a high voltage end of the detector APD through a detector high voltage pin in the electrical interface. An input end of the limited amplifier LIA may connect with an output end of a detector trans-impedance amplifier (APD/TIA) through differential signal output pins RD+, RD− in the electrical interface. The limited amplifier LIA may be configured to receive a weak electrical signal sent from the detector APD/TIA, perform a limited amplification to the week electrical signal and send the amplified electrical signal to the optical module control circuit 220 on the system board 200.

The memory unit EEPROM may connect with the main control chip MCU of the optical module control circuit 220 on the system board 200 through a data transmission pin in the electrical interface for transmitting SDA (serial data) and/or SCL (serial clock). The main control chip MCU may read data in the memory unit EEPROM though the data transmission pin.

As summarized above, in the case of employing the electro-absorption modulated laser EML, the electrical interface may need to have 14 pins at most. The optical module control circuit 220 on the system board 200 may be configured to supply operation voltage to the optical assembly and the memory unit through a power supply pin.

The main control chip MCU may be configured to control various functional components in the optical module 100 and report a Digital Diagnostic Monitoring Interface (DDMI) state of the optical module 100 to the optical module control circuit 220 on the system board 200 by an Inter-Integrated Circuit (I2C) interface.

Figure 3:
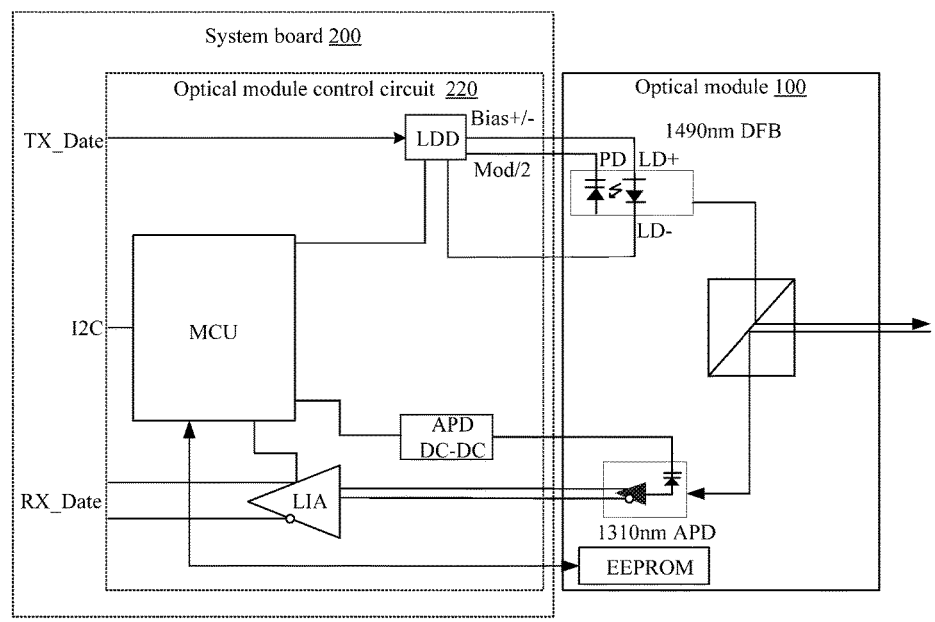
FIG. 3 is an electrical schematic diagram of an optical module according to another example of the present invention.

According to another example of the present invention, the optical module 100 may employ a distributed feedback laser DFB. As shown in FIG. 3, the distributed feedback laser DFB may include a laser emitting diode LD and a back light detector PD. Correspondingly, the laser driver LDD of the optical module control circuit 220 on the system board 200 may connect with the laser emitting diode LD through laser emitting diode biasing pins LD+, LD− in the electrical interface and may connect with the back light detector PD through a back light detector pin in the electrical interface. For the distributed feedback laser DFB, a modulated signal sent from the laser driver LDD may be loaded on the laser emitting diode LD of the distributed feedback laser DFB through the biasing pins LD+, LD− in a way of Bias±Mod/2, and may form an APC circuit with the back light detector PD through the back light detector pin. As such, the number of pins for the electrical interface may be decreased to 10, the volume of the optical module 100 may be further decreased, and the number of pluggable optical modules on one single system board 200 may be further increased.

As shown in FIG. 3, when employing the DFB, the connection of the detector APD is similar to that of the above example employing the EML. That is, the input end of the detector boost voltage circuit APD DC-DC may connect with a main control chip MCU, and its output end may connect with the high voltage end of the detector APD through a detector high voltage pin in the electrical interface. The input end of the limited amplifier LIA may connect with the output end of the detector APD through differential signal output pins RD+, RD− in the electrical interface. Its implementation principle may refer to the above, so the detailed description thereof will be omitted.

It should be noted that the present invention is also applicable to an optical module with the detector being PIN.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "comprises" means comprises but not limited to, the term "comprising" means comprising but not limited to, and the term "based on" means based at least in part on.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

What is claimed is:

1. An optical module comprising:
a housing;
a circuit board arranged in the housing and provided with an electrical interface;
an optical assembly arranged in the housing, the optical assembly is configured to be connected with the circuit board electrically and to perform signal transformation between an optical signal and an electrical signal;
an memory unit arranged in the housing, the memory unit is configured to be connected with the circuit board electrically and to store an operation parameter of the optical assembly;
wherein, the electrical interface is configured with
a first pin to be connected with a data transmission pin of the memory unit, through which a main control chip in an outside system is allowed to read the operation parameter of the optical assembly, and
a second pin to be connected with a drive end of providing drive for the optical assembly, through which a drive circuit in the outside system is allowed to drive the optical assembly in case that the drive circuit is configured in accordance with the operation parameter of the optical assembly by the main control chip;
wherein:
the optical assembly comprises an electro-absorption modulated laser (EML) which is configured to generate a downstream optical signal of a speed and wavelength in accordance with an electrical signal,
the electro-absorption modulated laser comprises an electro-absorption modulator, a laser emitting diode, a back light detector and a thermistor,
the electro-absorption modulator in the optical assembly is configured to, through an electro-absorption modulator drive pin in the electrical interface, connect a laser driver in the drive circuit, which is configured to receive a reshaped electrical signal from a clock recovery unit in an optical module control circuit in the outside system, which is sent by a system board to the clock recovery unit and reshaped by the clock recovery unit,
the laser emitting diode in the optical assembly is configured to connect the laser driver in the drive circuit through an electro-absorption modulation drive pin in the electrical interface,
the back light detector in the optical assembly is configured to connect the laser driver in the drive circuit through a back light detector pin in the electrical interface,
the thermistor in the optical assembly is configured to connect a thermoelectric cooler controller in the optical module control circuit through a thermistor drive pin in the electrical interface, and
the electro-absorption modulator in the optical assembly is configured to obtain a static negative voltage from an electro-absorption biasing circuit in the optical module control circuit through an electro-absorption modulator drive pin in the electrical interface.

2. The optical module according to claim 1, wherein, the optical assembly comprises a detector which is configured to transform a received optical signal into an electrical signal.

3. The optical module according to claim 1, wherein, the memory unit comprises an electrically erasable programmable read only memory (EEPROM).

4. The optical module according to claim 1, wherein, the electrical interface comprises a gold finger.

5. An optical line terminal device comprising:
an optical module comprising:
a housing;
a circuit board arranged in the housing and provided with an electrical interface;
an optical assembly arranged in the housing, the optical assembly is configured to be connected with the circuit board electrically and to perform signal transformation between an optical signal and an electrical signal; and
an memory unit arranged in the housing, the memory unit is configured to be connected with the circuit board electrically and to store an operation parameter of the optical assembly;
a system board provided with an optical module control circuit which is configured to be pluggable connected with the optical module by a slot matching with the electrical interface of the optical module and comprises a main control chip and a drive circuit,
wherein, the electrical interface is configured with
a first pin to be connected with a data transmission pin of the memory unit, through which the main control chip is allowed to read the operation parameter of the optical assembly; and
a second pin to be connected with a drive end of providing drive for the optical assembly, through which the drive circuit is allowed to drive the optical assembly in case that the drive circuit is configured in accordance with the operation parameter of the optical assembly by the main control chip; and
wherein:
the optical assembly comprises an electro-absorption modulated laser (EML) which is configured to generate a downstream optical signal of a speed and wavelength in accordance with an electrical signal,
the electro-absorption modulated laser comprises an electro-absorption modulator, a laser emitting diode, a back light detector and a thermistor,
the drive circuit comprises a laser driver which is configured to be connected with:
the electro-absorption modulator through an electro-absorption modulator drive pin in the electrical interface,
the laser emitting diode through a the laser emitting diode biasing pin in the electrical interface, and
the back light detector through a back light detector pin in the electrical interface,
the optical module control circuit further comprises:
a clock recovery unit configured to:
receive a downstream electrical signal sent by the system board,
perform a clock recovery reshaping to the electrical signal, and
send the reshaped electrical signal to the laser driver,
a thermoelectric cooler controller configured to be connected with the thermistor through a thermistor drive pin in the electrical interface, and
an electro-absorption biasing circuit configured to provide the electro-absorption modulator with a static negative voltage through an electro-absorption modulator drive pin in the electrical interface.

6. The optical line terminal device according to claim 5, wherein, the optical assembly comprises a detector which is configured to transform a received optical signal into an electrical signal.

7. The optical line terminal device according to claim 5, wherein, the memory unit comprises an electrically erasable programmable read only memory (EEPROM).

8. The optical line terminal device according to claim 5, wherein, the electrical interface comprises a gold finger.

9. The optical line terminal device according to claim 5, wherein:
the optical assembly comprises a distributed feedback laser which is configured to generate a downstream optical signal of a speed and wavelength in accordance with an electrical signal,
the distributed feedback laser comprises a laser emitting diode and a back light detector,
the drive circuit comprises a laser driver which is configured to be connected with
the laser emitting diode through a laser emitting diode biasing pin in the electrical interface, and
the back light detector through a back light detector pin in the electrical interface.

10. An optical line terminal device comprising:
an optical module comprising:
a housing;
a circuit board arranged in the housing and provided with an electrical interface;
an optical assembly arranged in the housing, the optical assembly is configured to be connected with the circuit board electrically and to perform signal transformation between an optical signal and an electrical signal; and
an memory unit arranged in the housing, the memory unit is configured to be connected with the circuit board electrically and to store an operation parameter of the optical assembly;
a system board provided with an optical module control circuit which is configured to be pluggable connected with the optical module by a slot matching with the electrical interface of the optical module and comprises a main control chip and a drive circuit,
wherein, the electrical interface is configured with:
a first pin to be connected with a data transmission pin of the memory unit, through which the main control chip is allowed to read the operation parameter of the optical assembly, and
a second pin to be connected with a drive end of providing drive for the optical assembly, through which the drive circuit is allowed to drive the optical assembly in case that the drive circuit is configured in accordance with the operation parameter of the optical assembly by the main control chip;
wherein, the optical assembly comprises a detector which is configured to
receive an upstream optical signal of a speed and wavelength corresponding to a burst mode, and
transform the upstream optical signal into an electrical signal; and
wherein the drive circuit comprises:
a detector boost circuit which is configured with:
an input end to be connected with the main control chip, and
an output end to be connected with a high voltage end of the detector through a detector high voltage pin of the electrical interface, and
a limited amplifier which is configured with:
an input end to be connected with an output end of the detector through differential signal output pins of the electrical interface.

* * * * *